United States Patent Office 3,086,588
Patented Apr. 23, 1963

3,086,588
LOW WATER-LOSS CEMENT COMPOSITION
Winton W. Wahl, Tulsa, Okla., and Charles D. Dever, Saginaw, and Robert F. Ryan, Midland, Mich., assignors to The Dow Chemical Company, Midland, Mich., a corporation of Delaware
No Drawing. Filed Sept. 25, 1959, Ser. No. 842,224
12 Claims. (Cl. 166—32)

The invention pertains to an improved low water-loss hydraulic cement composition and method of use thereof in cementing wells penetrating subterranean formations. The term hydraulic cement, as used herein refers to Portland and aluminous cements with or without additaments to control the setting time.

Hydraulic cement compositions are usually employed by making an aqueous slurry thereof and employing the slurry in a confined zone at the place to be cemented, the slurry thereafter setting or hardening into a monolithic solid. Among the extensive uses of hydraulic cement compositions are cementing of wells, e.g., cementing casing in place and cementing off thief zones and zones producing undesirable fluids such as a water-producing stratum in an oil or gas well.

A problem associated with well-cementing operations has been loss of water from the slurry to a porous stratum during the period of injecting and setting of the slurry. An appreciable loss of water from the slurry prior to setting is to be avoided if the cement is to remain pumpable and is to set uniformly and have ultimate maximum strength.

Attempts have been made to inhibit or lessen water loss from aqueous hydraulic cement compositions during injection and setting. These atempts have, in a large number of instances, included incorporating an additament in the cement slurry which lessens the loss of water into a porous formation. Among such additaments are latex emulsions, cellulose derivatives, starch, and sulfonated polystyrene.

Additaments employed for the purpose of lessening water loss of such slurries have been only partially successful. In some instances, the additament has failed to lessen the water loss sufficiently. In other instances it has had an adverse effect upon set time, viscosity, or the ultimate strength of the set cement when employed under conditions encountered in well-cementing operations. Among the more successful attempts to lessen water loss from hydraulic cement slurries is that described in U.S. Patent 2,865,876 which employs a polystyrene sulfonate as an additament to such slurries. However, polystyrene sulfonate is not sufficiently effective over all conditions encountered in well-cementing, e.g., at the higher temperatures and pressures.

A need, therefore, exists for an aqueous cementing composition which undergoes less water loss during the setting period and which does not have objectionable concomitant adverse effects upon the slurry or upon the properties of the set cement.

The principal object of the invention is to provide a cementing composition which is of good fluid consistency, which lends itself to being pumped into zones in a formation traversed by a well having a wide range of temperatures, which sets up sufficiently slowly to allow ample time for its preparation and emplacement, and which sets up to a hard unitary solid mass within a reasonable time, and to provide an improved method of well cementing.

The manner of accomplishing these and related objects of the invention is made clear in the ensuing description and is defined in the appended claims.

The invention is an improved low water-loss cement composition consisting of an hydraulic cement and sulfonated polyvinyltoluene or the ammonium or alkali metal salt thereof, with or without ammonium sulfate or an alkali metal sulfate, the aqueous slurry of said composition, and method of cementing a well employing the slurry.

The preferred embodiment of the invention employs some ammonium or alkali metal sulfate with the sulfonated polyvinyltoluene polymer. If the salt of the sulfonated polymer is desired, it is then neutralized with ammonium or an alkali metal hydroxide. An excess of sulfonating agent will produce some sulfate of the metal of the hydroxide used. Said sulfate may, therefore, be present in the salt of the sulfonated polyvinyltoluene, as a result of neutralizing the sulfonated polyvinyltoluene by addition of ammonium or an alkali metal hydroxide. However, the sulfate may be added to the sulfonated polyvinyltoluene to be employed or to the dry cement prior to its use in the practice of the invention or to the aqueous cement slurry containing the sulfonated polyvinyltoluene just prior to or while it is being injected into a well. Since the sulfonating agent is commonly employed in excess during the sulfonation of the polyvinyltoluene and is thereafter neutralized when the H+ form of the polyvinyltoluene thus produced is subsequently converted to the ammonium or alkali metal salt, such excess sulfonating agent forms the sulfate corresponding to the hydroxide used. Since aqueous NaOH or NH$_4$OH is commonly employed for neutralizing the H+ form, Na$_2$SO$_4$ or (NH$_4$)$_2$SO$_4$ is the salt most often present in the neutralized polymer, and since Na$_2$SO$_4$ or (NH$_4$)$_2$SO$_4$ is the preferred salt to employ, if any is desired in the practice of the invention, this embodiment is usually practiced by employing a sulfonated polyvinyltoluene which already contains a desirable percent of Na$_2$SO$_4$ or (NH$_4$)$_2$SO$_4$ formed therein during its preparation.

The sulfonated polyvinyltoluene for use in the practice of the invention, i.e., the H+ form, may be illustrated by the following structure:

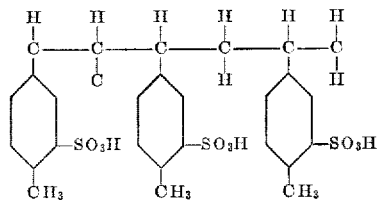

The sodium salt of sulfonated polyvinyltoluene may be illustrated by the following structure:

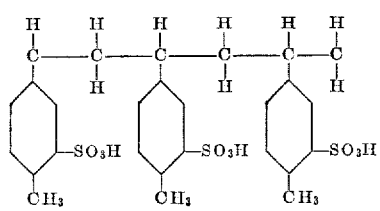

Methods of preparing sulfonated polyvinyltoluene are well known. U.S. Patent 2,283,236 describes a method of preparation thereof from light oil and condensate fractions obtained in the manufacture of artificial gas. Another method consists essentially of the following steps: dehydrogenation of ethyltoluene to produce monomeric vinyltoluene, emulsion polymerization of the vinyltoluene, employing an emulsifying agent, preferably an anionic type in an amount between about 0.5 and 5.0 percent, and a persulfate or peroxide type catalyst in an amount between about 0.05 and 0.5 percent at about 60° to 90° C., treatment of the so-produced polymerized vinyltoluene with a sulfonated agent in a chlorinated hydrocarbon medium to produce the sulfonated polymer which settles out, subsequent to dissolution of the so-produced polymer in water, drying the polymer to remove adhering emulsion medium and water therefrom, and thereafter cooling and purifying the polymer as by passing it through a cation exchange resin. The H+ form, i.e., acid type polymer, thus produced may be employed or it may be converted to the Na+ form, i.e., sodium polyvinyltoluene sulfonate, by neutralization with aqueous NaOH and evaporating off the water. The Na+ form is more stable on storage and is therefore usually preferred.

The preferred sulfonated polyvinyltoluene employed in the practice of the invention is that produced by sulfonating the polymer formed by polymerizing the vinyltoluene emulsion for from 3 to 4.5 hours. The sulfonated polymer produced therefrom is water-soluble and has a molecular weight of between 100,000 and 4,000,000, as determined by preparing a 10 percent by weight solution of the polymer in toluene, determining the viscosity according to A.S.T.M. test 703–44T at 25° C. employing an Ostwald viscosimeter and thereafter ascertaining the molecular weight as described in Styrene, Its Polymers, Copolymers, and Derivatives, by Boundy and Boyer, page 319, Reinhold Publishing Company, New York (1952). The polymer is employed in the practice of the invention in an amount of between 0.2 and 4.0 parts by weight per 100 parts of the dry hydraulic cement employed. A preferable range of the polymer is between 0.5 and 2.0 parts per hundred of the dry cement.

Although sodium or ammonium polyvinyltoluene sulfonate can be prepared which is substantially free of any residual sulfate, such preparation is generally not practical, it being much more convenient and efficient to permit some of the sulfate salt to be formed. The amount of such sulfate present in the final product may be readily controlled, however, so long as an appreciable excess of sulfonating agent is used. Furthermore, when desired, the final product may be further treated and the sulfate, so produced, removed, e.g., by treatment with an ion exchange resin. Therefore, although no ammonium or alkali metal sulfate is essential in the practice of the invention, it is usually employed together with the sulfonated polyvinyltoluene polymer because its presence therewith is beneficial on the thickening time of cements, retarded with salts of lignosulfonic acid, and often supplements the fluid-loss properties of the polymer and because the sulfonated polyvinyltoluene polymer is easier prepared containing such sulfate. The amount of sodium or ammonium sulfate to employ, in the presence of at least 0.2 part of the sulfonated polyvinylsulfonate, in the practice of the invention, is between 0.2 and 2.0 parts, and preferably between 0.5 and 1.0 part, per 100 parts of dry hydraulic cement. Sulfonated polyvinyltoluene containing between 15 and 60 parts of sodium sulfate per 100 parts of the sulfate to 100 parts of the polymer is usually used. The presence of the sulfate is only highly significant when less than 0.5 percent, by weight of the dry cement, of the polymer is employed with a lignosulfonate-type retarded cement.

Any hydraulic cements falling within the American Petroleum Institute (API) classes designated A, B, C, D, E, F, and N may be employed in the practice of the invention. Classes A, D, and E are usually employed. Class A is often referred to as regular or normal setting Portland cement and classes D and E as slow-setting cements. Cements used in well-cementing are largely one of the above designated cements. Descriptions of these cements may be found in Recommended Practice for Testing Well Cements and Additives, 7th ed. (January 1959), API RP 10B, procurable from the American Petroleum Institute, New York, New York. Further descriptions of cements falling within these classes are contained in U.S. Patents 2,580,565, 2,771,953, and 2,782,858.

Analyses of typical class A, D, and E cements are set out below:

CLASS A

| Ingredient: | Weight percent |
|---|---|
| Tricalcium silicate | 53.4 |
| Dicalcium silicate | 21.5 |
| Tricalcium aluminate | 10.2 |
| Tetracalcium aluminoferrite | 8.2 |
| Calcium sulfate | 3.9 |
| Undetermined | Balance |

CLASS D

| Ingredient: | |
|---|---|
| Tricalcium silicate | 30.7 |
| Dicalcium silicate | 45.2 |
| Tetracalcium aluminoferrite | 20.1 |
| Calcium sulfate | 2.2 |
| Undetermined | Balance |

CLASS E

| Ingredient: | |
|---|---|
| Tricalcium silicate | 53.4 |
| Dicalcium silicate | 29.9 |
| Tricalcium aluminate | 5.6 |
| Tetracalcium aluminoferrite | 13.7 |
| Starch (in qualitative amounts) | |
| Undetermined | Balance |

In carrying out the invention, the dry polymer is advantageously admixed, with or without the ammonium or alkali metal sulfate, with the dry cement and the mixture or blend thus made stored until it is to be used at which time it is admixed with water to form a slurry according to a conventional mixing procedure. The slurry may be made either batchwise as in a conventional mixer, e.g., a paddle mixer, or it may be continuously mixed as by feeding the blended dry mixture of polymer and cement into the water as it is being pumped into a well being cemented. A convenient mode of mixing continuously is to feed the dry blend and water into separate feed lines which merge at or near the well head or at some other convenient point and the resulting aqueous slurry is pumped into the zone in the formation where the cementing operation is to be done.

The following tests were run to show the effectiveness of the presence of sulfonated polyvinyltoluene in hydraulic cement slurries to inhibit fluid loss. The procedure followed in the test, including the preparation of the slurry, the measurement of the thickening time and fluid loss of the slurry and of the compression strength of the set cement was that described in the A.P.I. Recommended Practice, API RP 10B, cited above, except that a pressure of 80 p.s.i.g. was employed, instead of 100 p.s.i.g. as stated in the par. 17–a, Section IV of API RP 10B to determine the fluid loss in some of the tests run. The pressure employed is set out hereinafter for the specific tests.

In the tests set out in Table I, 500 grams of dry class A hydraulic cement and 230 grams of water were used. The class of cement, amount of additament, and the effect on fluid loss of the slurry and compression strength of the set cement are set out in Table I. The blank contained no fluid loss additament and was run for comparative purposes.

Table I

[Fluid loss effect on slurry composed of 500 grams of type A cement and 230 grams of water]

| Test No. | Sulfonated Polyvinyltoluene Used | | | Fluid Loss in ml. in 30 min. Using API RP 10B Par. 17(a) at 80 p.s.i.g. |
|---|---|---|---|---|
| | Type | Molecular Weight | Percent Polymer, Based on 100 Parts Dry Cement | |
| Blank | | | None | Over 600.0 |
| 1 | Na | 2×10⁵ | 0.2 | 290.0 |
| 2 | Na | 2×10⁵ | 0.5 | 32.0 |
| 3 | Na | 2×10⁵ | 1.0 | 11.0 |
| 4 | Na | 2×10⁵ | 1.5 | 5.5 |
| 5 | Na | 2×10⁵ | 2.0 | 3.7 |
| 6 | Na | 3×10⁵ | 0.5 | 36.0 |
| 7 | Na | 3×10⁵ | 1.0 | 10.5 |
| 8 | Na | 3×10⁵ | 1.5 | 5.5 |
| 9 | Na | 3×10⁵ | 2.0 | 3.4 |
| 10 | H | 3×10⁵ | 1.0 | 13.0 |
| 11 | Na | 1×10⁶ | 0.5 | 58.0 |
| 12 | Na | 1×10⁶ | 1.0 | 12.0 |
| 13 | Na | 1×10⁶ | 1.5 | 6.5 |
| 14 | Na | 1×10⁶ | 2.0 | 3.2 |
| 15 | H | 3×10⁶ | 1.0 | 24.0 |
| 16 | Na | 4×10⁶ | 1.0 | 21.0 |
| 17 | Na | 4×10⁶ | 1.5 | 5.6 |

An examination of Table I shows that the fluid loss of an aqueous type A cement slurry is markedly reduced when only 0.5 part by weigth of sulfonated polyvinyltoluene is admixed per 100 parts of the dry cement. It also shows that in most of the tests, more than 1.5 parts per 100 parts of the dry cement did not add appreciably to the reduction of fluid loss. Up to 2.0 parts, however, had some additional benefit. Greater than 2 parts per 100 may be added without adverse effects, but do not appear justified.

Further tests were run to show the effects on thickening time of the slurry prepared according to the invention. Thickening times are affected by conditions existing at different depths in a well. Therefore, the schedules of the Well Simulation Test described in API RP 10B (and employed in U.S. Patents 2,266,733 and 2,771,953) were followed as designated in Table II in determining thickening times. The cement employed in the tests set out in Table II were Starcor and Unaflo, both containing a retarder of the setting of cement but which retarder is not a lignosulfonate type.

Table II

[Effect on thickening time of additament on slurry composed of 500 grams of cement and 167.5 grams of water with or without sodium salt of sulfonated polyvinyltoluene]

| Test No. | Class Cement Used | Parts by Weight of Polymer per 100 of Dry Cement | Molecular Weight of Polymer | API Schedule Followed | Thick- Time in Hours and Minutes |
|---|---|---|---|---|---|
| Blank | D (Starcor) | None | | 8 | 1:43 |
| 18 | D (Starcor) | 1.0 | 3×10⁵ | 8 | 2:12 |
| Blank | E (Unaflo) | None | | 18 | 1:35 |
| 19 | E (Unaflo) | 1.0 | 3×10⁵ | 18 | 2:39 |
| 20 | E (Unaflo) | 1.0 | 2×10⁵ | 18 | 1:42 |

An examination of Table II shows that the thickening time is extended in aqueous slurries of class D and E cements, which are not retarded by a lignosulfonate, when sodium polyvinyltoluene sulfonate is admixed therewith in an amount of 1 part per 100 parts by weight of dry cement.

Additional tests were run to show the effect of the presence of sodium polyvinyltoluene sulfonate in cement slurries of the compression strength values of the set cement. The slurries were made similarly to those shown in Table II, i.e., 500 grams of cement were admixed with 5 grams (1 part by weight) of sodium polyvinyltoluene sulfonate and the mixture slurried in 167.5 grams of water. The compressive strength values were determined according to Section V of API RP 10B at atmospheric pressure.

Table III

[Effect of additive on compression strength]

| Test No. | Class Cement Used | Sulfonated Sodium Polyvinyltoluene | | Compression Strength After 24 Hours | |
|---|---|---|---|---|---|
| | | Parts per 100 of Cement | Molecular Weight | Temperature of test in °F. | Values in p.s.i.g. |
| Blank | A | None | | 95 | 2,457 |
| 21 | A | 1.0 | 3×10⁵ | 95 | 1,831 |
| Blank | A | None | | 125 | 4,956 |
| 22 | A | 1.0 | 3×10⁵ | 125 | 3,995 |
| Blank | E | None | | 160 | 4,709 |
| 23 | E | 1.0 | 3×10⁵ | 160 | 3,071 |
| Blank | E | None | | 200 | 6,197 |
| 24 | E | None | | 200 | 5,387 |

An examination of Table III shows that, although the compression strength values are somewhat reduced by the use of the sulfonated sodium polyvinyltoluene additament, the amount of reduction is not great and the strength when the additament is used is clearly adequate for well cementing purposes.

Further tests were run to determine the effect on fluid loss of cement slurries by the practice of the invention in contrast to the effect of a known additament currently being employed in well-cementing operations. 500 grams of cement and 5.0 grams of the additament were blended dry and the blend admixed with 197.5 grams of water to make a slurry. The fluid loss of the slurry was determined by placing the slurry in a consistometer of the type described in U.S. Patent 2,266,733 following the procedure of Schedule 8 of the Well Simulation Test set out in API RP 10B, and thereafter determining the fluid loss in a Baroid HT–HP filter press. HT indicates a high temperature of 200° F. and HP indicates a high pressure of 500 p.s.i.g. The HT–HP test is fully described in API RP 10B, in par. 17–b under Section IV thereof. The values thus obtained were recorded as the product obtained by multiplying by a factor of 2 as directed in par. 21–a of API RP 10B.

Table IV

[Effect on fluid loss of slurries prepared according to known practice and according to the invention]

| Test No. | API Class Cement Used | Additament Used | Fluid Loss in Ml. in 30 Minutes |
|---|---|---|---|
| Blank | A | 1 percent Sulfonated sodium polystyrene (Lustrex x-770). | Over 600 |
| 25 | A | 1 percent Sulfonated sodium polyvinyltoluene. | 35 |
| 26 | E | do | 32 |

The fluid loss in milliliters in 30 minutes as set out in Table IV shows conclusively that, at temperatures and pressures very frequently encountered in wells being cemented, the composition of the slurry of the invention retains its fluid loss preventive properties whereas the known composition used was no better than the neat cement slurry as shown in the blank run of Table I.

Tests were run to show the effect of adding both the sodium salt of sulfonated polyvinyltoluene and sodium sulfate to the dry hydraulic cement prior to making an aqueous slurry thereof. Both thickening time tests and fluid loss tests were conducted according to the procedure of Sections VII and IV, respectively, of API RP 10B. Two type E (retarded) cements were employed: Unaflo which does not contain a lignosulfonate type retarder and Trinity Inferno which contains calcium lignosulfonate as a retarder.

The test samples were prepared as follows: 300 grams of the dry hydraulic cement were placed in a mixer. To this were admixed both the sulfonated polymer, having an average molecular weight of 400,000 and sodium sulfate in amounts sufficient to provide the percents by weight (based on 100 parts of dry cement) as set out in Table V. To this mixture were admixed 156 milliliters of water (a weight ratio of water to dry cement of about 52:100) to make the slurries employed in the tests. Thickening time tests were then run following Schedule 18 of the Well Simulation Test and the Filter Loss Tests employing the high pressure filter press described under par. 18–d of API RP 10B. The filter loss or fluid loss values thus obtained were recorded as directed in par. 21–a of API RP 10B.

either with or without the sodium sulfate. However, the fluid loss was equallly good and in some instances better when sodium sulfate was present.

As illustrative of practicing the invention in cementing a well, 113 sacks (10,600 pounds) of API class A hydraulic cement and 106 pounds of sulfonated sodium polyvinyltoluene having a molecular weight of about $3 \times 10^5$ and a pH value in an aqueous solution of about 7 are admixed dry in a rotary blender, e.g., a Rotovoy. 586 gallons (4880 pounds) of water are placed in a cylindrical paddle mixer and the above prepared dry blend admixed therewith in the paddle mixer. The resulting slurry, having a density of about 15.6 pounds/gallon, is Table V

[Effect of adding $Na_2SO_4$ to the cement polymer mixture prior to slurrying]

| Test No. | Type of Cement Employed, 100 Parts by Weight | Amount of Polymer in Parts by Weight | Amount of Sulfate in Parts by Weight | Thickening Time, Schedule 18 in Hr. and Min. | Fluid Loss, ml./30 Min. 200° F. and 500 p.s.i.g. |
|---|---|---|---|---|---|
| Blank (1) | Type E Retarded Cement containing no lignosulfonate additive. | 0.0 | 0.0 | >2 hours[1] | >600. |
| Blank (2) | ....do.... | 0.0 | 1.0 $Na_2SO_4$ | ....do.... | >600. |
| 27 | ....do.... | 1.0 | 0.5 $Na_2SO_4$ | ....do.... | 36. |
| 28 | ....do.... | 1.0 | 1.0 $Na_2SO_4$ | ....do.... | 39. |
| 29 | Type E Retarded Cement containing calcium lignosulfonate. | 0.2 | 0.0 | 0:06 | (2). |
| 30 | ....do.... | 0.2 | 0.25 $Na_2SO_4$ | 1:20 | Not determined. |
| 31 | ....do.... | 0.2 | 1.0 $Na_2SO_4$ | 1:20 | Do. |
| 32 | ....do.... | 1.0 | 0.0 | 0:33 | 55. |
| 33 | ....do.... | 1.0 | 0.25 $Na_2SO_4$ | 4:05 | 55. |
| 34 | ....do.... | 1.0 | 1.0 $Na_2SO_4$ | 2:30 | 76. |
| 35 | ....do.... | 4.0 | 0.0 | 2:03 | 7. |
| 36 | ....do.... | 4.0 | 0.25 $Na_2SO_4$ | 2:30 | 5. |
| 37 | ....do.... | 4.0 | 1.0 $Na_2SO_4$ | 2:10 | 7. |
| 38 | ....do.... | 1.0 | 1.0 $K_2SO_4$ | 2:28 | 83. |
| 39 | ....do.... | 1.0 | 1.0 $(NH_4)_2SO_4$ | 3:43 | 45. |

[1] Thickening time test was run for only two hours at which time slurry showed no indications of thickening.
[2] Slurry thickened too fast to obtain fluid loss values.

Table V shows that the presence of one of $Na_2SO_4$, $K_2SO_4$, or $(NH_4)_2SO_4$ with sodium sulfonated polyvinyltoluene in the amounts of 0.25 and 1.0 percent, based on the weight of the dry calcium lignosulfonate-retarded cement, prevented premature thickening of a cement slurry. It also shows that when the percent of the sulfate was increased from 0.25 to 1.0 percent, the gel time lessened showing that best results are obtained when employing less than 1 percent of the sulfate. A ratio of between 0.1 and 0.25 of the sulfate to between 1 and 4 parts of the polymer appear to give best results with this type of cement. The table also shows that, for reasons not understood, the thickening time of the lignosulfonate-retarded cement is only seriously shortened when the polymer is employed in a relatively small amount. The results shown on the table indicate that when an amount of polymer substantially greater than 1 percent is employed the sodium or ammonium sulfonate is not essential.

Other tests were run similar to those shown in Table II employing 4 percent of the polymer in the lignosulfonate-retarded cement. The increase in the sulfate was found to have definite adverse effects on the cement slurry, i.e., the thickening time was lessened and the fluid loss increased, indicating that the use of more than about 2 percent of the sulfate with the polymer is not recommended.

Still other tests were run on cement slurries prepared as in Table V except class A cement and class D and E cements, containing such retarders as casein, natural gums, e.g., gum arabic, hydroxyorganic acids, e.g., tartaric acid, cellulose ethers, boric acid salts, alkali phosphates, modified starch, and dextrine. The sodium salt of sulfonated polyvinyltoluene was employed in amounts between 0.5 and 2.0 percent with and without sodium sulfate in an amount between ¼ and ½ the amount of the polymer employed. Satisfactory results were obtained in all tests on both thickening time and fluid loss, then pumped into the zone in the well to be cemented employing cementing apparatus of the type employed in conventional cementing practice.

Having described the invention, what is claimed and desired to be protected by Letters Patent is:

1. A dry cement composition for admixture with water to make a pumpable slurry which is sufficiently stable against premature thickening and setting for emplacement in a confined zone to be cemented and which sets when thus confined to a monolithic mass of high compression strength consisting essentially of a mixture of an hydraulic cement and between 0.2 and 4.0 parts, per 100 parts by weight of the cement, of a polymer selected from the class consisting of sulfonated polyvinyltoluene and water-soluble salts thereof having a molecular weight of between 100,000 and 4,000,000.

2. A dry cement composition for admixture with water to make a pumpable slurry which is sufficiently stable against premature thickening and setting for emplacement in a confined zone to be cemented which sets when thus confined to a monolithic mass of high compression strength consisting by weight of 100 parts of an hydraulic cement, between 0.2 and 4.0 parts of a polymer selected from the class consisting of polyvinyltoluene and ammonium and alkali metal salts thereof, having a molecular weight of between 100,000 and 4,000,000, and between 0.2 and 2.0 parts of a sulfate selected from the class consisting of ammonium and alkali metal sulfates.

3. The composition of claim 2, wherein the hydraulic cement is a retarded setting cement containing a lignosulfonate salt.

4. A slurry which is pumpable at the temperature and pressure conditions encountered in a formation penetrated by a well for a sufficient time to permit emplacement thereof in said formation and which sets in situ after being emplaced therein within 24 hours to a high compression strength monolithic mass, said slurry consisting essentially of 100 parts of an hydraulic cement, between 0.5 and 4.0 parts of a polymer selected from the class consisting of sulfonated polyvinyltoluene and water-soluble salts thereof having a molecular weight of between 100,000 and 4,000,000 and between 35 and 55 parts by weight of water per 100 parts of dry cement.

5. The slurry of claim 4 wherein said slurry contains between 0.2 and 2.0 parts, per 100 parts of dry cement, of a salt selected from the class consisting of ammonium and alkali metal sulfates.

6. The method of cementing a well traversing a subterranean formation consisting of admixing with a dry hydraulic cement a polymer selected from the class consisting of sulfonated polyvinyltoluene and water-soluble salts thereof, having a molecular weight of between 100,000 and 4,000,000 in an amount of between 0.2 and 4.0 parts by weight of the dry cement, and between 35 and 55 parts of water per 100 parts of dry cement, to prepare an aqueous slurry, and injecting the slurry thus made down the well into a confined zone in said formation, and closing in the well until the slurry has set to a hard monolithic mass.

7. The method of claim 6 wherein the molecular weight of the sulfonated polyvinyltoluene is at least 200,000 and is employed in an amount between 0.5 and 2.0 parts per 100 parts by weight of dry cement used.

8. The method of claim 6 wherein the sulfonated polyvinyltoluene polymer and the cement are admixed dry and the resulting mixture and water pumped into a common line leading into the well to be cemented in a continuous mixing and cementing operation.

9. The method of claim 6 wherein the sulfonated polyvinyltoluene polymer is the sodium salt.

10. The method of claim 9 wherein the sodium salt of sulfonated polyvinyltoluene contains between 15 and 60 parts by weight of sodium sulfate per 100 parts of the sulfonated polymer.

11. The method of cementing off a confined zone in a well consisting of injecting down the well and into said zone an aqueous slurry consisting by weight of 100 parts of an hydraulic cement between 0.2 and 4.0 parts of a polymer having a molecular weight of from 200,000 to 4,000,000 selected from the class consisting of sulfonated polyvinyltoluene and the ammonium and alkali metal salts thereof, between 0.2 and 2.0 parts of a sulfate selected from the ammonium and alkali metal sulfates, and between 35 and 55 parts of water.

12. The method of claim 11 wherein the hydraulic cement contains a retarder which extends the setting time of the cement slurry.

References Cited in the file of this patent
UNITED STATES PATENTS

| | | |
|---|---|---|
| 1,214,910 | Goddard | Feb. 6, 1917 |
| 2,865,876 | Scott | Dec. 23, 1958 |
| 2,945,842 | Eichhorn et al. | July 19, 1960 |

UNITED STATES PATENT OFFICE
CERTIFICATE OF CORRECTION

Patent No. 3,086,588            April 23, 1963

Winton W. Wahl et al.

It is hereby certified that error appears in the above numbered patent requiring correction and that the said Letters Patent should read as corrected below.

Column 2, lines 57 to 65, the formula should appear as shown below instead of as in the patent:

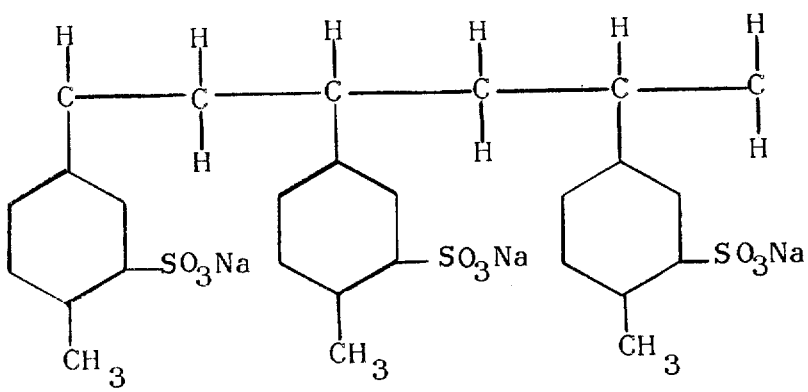

column 7, line 55, for "sulfonate" read -- sulfate --.

Signed and sealed this 21st day of January 1964.

(SEAL)
Attest:
ERNEST W. SWIDER

Attesting Officer

EDWIN L. REYNOLDS

Acting Commissioner of Patents